United States Patent
Gonze et al.

(10) Patent No.: US 8,312,712 B2
(45) Date of Patent: Nov. 20, 2012

(54) ELECTRICALLY HEATED PARTICULATE FILTER REGENERATION DURING ENGINE START/STOP OPERATION

(75) Inventors: Eugene V. Gonze, Pinckney, MI (US); Michael J. Paratore, Jr., Howell, MI (US); Stuart R. Smith, Howell, MI (US)

(73) Assignee: GM Global Technology Operations LLC

( * ) Notice: Subject to any disclaimer, the term of this patent is extended or adjusted under 35 U.S.C. 154(b) by 435 days.

(21) Appl. No.: 12/493,488

(22) Filed: Jun. 29, 2009

(65) Prior Publication Data

US 2010/0326403 A1    Dec. 30, 2010

(51) Int. Cl.
*F01N 3/00* (2006.01)
(52) U.S. Cl. ............... 60/295; 60/311; 60/285
(58) Field of Classification Search .......... 60/285, 60/286, 303, 311, 295
See application file for complete search history.

(56) References Cited

U.S. PATENT DOCUMENTS

| | | | |
|---|---|---|---|
| 4,404,795 A * | 9/1983 | Oishi et al. ............ 60/274 |
| 4,485,622 A * | 12/1984 | Takagi et al. .......... 60/296 |
| 4,505,726 A | 3/1985 | Takeuchi |
| 4,516,993 A | 5/1985 | Takeuchi |
| 5,457,945 A | 10/1995 | Adiletta |
| 5,458,673 A | 10/1995 | Kojima et al. |
| 5,711,149 A | 1/1998 | Araki |
| 5,746,989 A | 5/1998 | Murachi et al. |
| 5,782,941 A | 7/1998 | Matsunuma et al. |
| 5,822,977 A * | 10/1998 | Fukuda et al. ......... 60/274 |
| 5,853,459 A | 12/1998 | Kuwamoto et al. |
| 5,863,311 A | 1/1999 | Nagai et al. |
| 5,974,791 A | 11/1999 | Hirota et al. |
| 6,233,927 B1 | 5/2001 | Hirota et al. |
| 6,235,254 B1 | 5/2001 | Murphy et al. |
| 2004/0144087 A1 * | 7/2004 | Kondou et al. ......... 60/295 |
| 2004/0226287 A1 * | 11/2004 | Edgar et al. ........... 60/295 |
| 2005/0120712 A1 | 6/2005 | Tsutsumoto et al. |
| 2007/0044460 A1 * | 3/2007 | Gonze et al. .......... 60/297 |
| 2007/0277515 A1 * | 12/2007 | Igarashi ................ 60/303 |
| 2008/0083212 A1 * | 4/2008 | Ament et al. .......... 60/295 |

FOREIGN PATENT DOCUMENTS

| | | |
|---|---|---|
| CN | 1470748 A | 1/2004 |
| CN | 101311506 A | 11/2008 |
| DE | 3403564 A1 | 8/1984 |
| EP | 1426592 A2 | 6/2004 |
| JP | 11-081985 | 3/1999 |
| JP | 2001-173429 A | 6/2001 |
| JP | 2004-19522 A | 1/2004 |

OTHER PUBLICATIONS

U.S. Appl. No. 11/209,427, filed Aug. 2005, Gonze.

* cited by examiner

*Primary Examiner* — Binh Q Tran
*Assistant Examiner* — Patrick Maines (57) ABSTRACT

A control system comprises a combustion control module and a regeneration control module. The combustion control module controls operation of a vehicle in a first mode during which a combustion engine is off and in a second mode during which the combustion engine is on. The regeneration control module is in communication with the combustion control module and activates an electric heater during the first mode to heat an inlet of a particulate matter (PM) filter. Exhaust gas produced by the combustion engine enters the inlet and initiates a regeneration cycle of the PM filter in the second mode.

20 Claims, 5 Drawing Sheets

ELECTRICALLY HEATED PARTICULATE FILTER REGENERATION DURING ENGINE START/STOP OPERATION

FIELD

The present disclosure relates to engine control systems and methods, and more particularly to control systems and methods for regeneration of electrically heated particulate filters during engine start/stop operation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines such as diesel engines and compression ignition engines may produce particulate matter (PM) that is filtered from exhaust gas and collected by a PM filter. The PM filter is disposed in an exhaust system of the engine. The PM filter reduces emissions of PM generated during combustion. Over time, the PM filter becomes full. During a process called regeneration, the PM may be burned within the PM filter.

There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

An engine control module (ECM) may regenerate the PM filter using an electrical heating technique. The electrical heating technique refers to the electrical heating of the exhaust gas entering the PM filter. One or more electrical coils may be disposed upstream from the PM filter and may be activated to heat the exhaust gas. The heated exhaust gas ignites PM in the PM filter which combusts through channels in the PM filter. Exhaust gas flow advances the PM through the channels.

The electrical heating technique provides a quick heating and light-off of the PM. Electrically heated PM reduction systems reduce fuel economy by a negligible amount but may be operation-limited based on exhaust flow. As exhaust gas flow increases, for example, above a particular flow rate (kg/s), the ability to initiate regeneration by the electrically heated element decreases. Furthermore, the ability to maintain PM combustion through the channels decreases when the exhaust gas flow increases above a particular flow rate.

The ECM may also control combustion in the engine to improve fuel economy of a vehicle and/or reduce emissions. During periods when the engine would normally be idling, such as when a driver applies a brake input and the vehicle is stopped, the ECM may stop fueling to the engine to stop combustion. When the engine stops, exhaust gas stops flowing through the exhaust system. When the ECM determines the driver is about to accelerate the vehicle, such as by releasing the brake input, the ECM may start the engine using an electric motor such as an engine starter. Combustion starts and exhaust gas begins to flow through the exhaust system.

SUMMARY

A control system comprises a combustion control module and a regeneration control module. The combustion control module controls operation of a vehicle in a first mode during which a combustion engine is off and in a second mode during which the combustion engine is on. The regeneration control module is in communication with the combustion control module and activates an electric heater during the first mode to heat an inlet of a particulate matter (PM) filter. Exhaust gas produced by the combustion engine enters the inlet and initiates a regeneration cycle of the PM filter in the second mode.

In other features, the regeneration control module controls the electric heater to a first temperature during the first mode. In still other features, the regeneration control module controls the electric heater to a second temperature based on at least one of a temperature of the exhaust gas, an oxygen concentration of the exhaust gas, and a flow rate of the exhaust gas during the second mode. In other features, the second temperature is less than the first temperature.

In still other features, the combustion control module operates the engine in the second mode when a temperature of the electric heater is greater than or equal to the first temperature for a predetermined period. The combustion control module operates the engine in one of the first mode and the second mode based on at least one of a speed of the vehicle and application of a brake input of the vehicle. The combustion control module operates the engine in the first mode when the speed of the vehicle is less than a predetermined speed threshold and the brake input is applied. In other features, the regeneration control module controls the electric heater to heat the PM filter to a temperature that is greater than or equal to a PM combustion temperature during the first mode.

In yet other features, a stopping frequency module determines a stopping frequency of the vehicle based on a speed of the vehicle during a predetermined period before the first mode, wherein the regeneration control module heats the exhaust gas input to the PM filter when the stopping frequency is greater than a predetermined frequency threshold. The regeneration control module heats the exhaust gas by adjusting an air-fuel ratio of the exhaust gas.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), a combinational logic circuit, an electronic circuit, a processor (shared, dedicated, or group) and memory that execute one or more software or firmware programs, and/or other suitable hardware components that provide the described functionality.

The electrical heating technique functions best when the exhaust gas flow rate is relatively low. For example only, the exhaust gas flow rate may be low when the engine operates in city driving conditions that include low engine speed and torque output as well as frequent vehicle stops and idling periods. The electric heater heats more quickly when the exhaust gas flow rate is low because less heat may be removed by the passing exhaust gas than when the exhaust gas flow rate is high.

Once the electric heater initiates combustion of PM in the PM filter, a high exhaust gas flow rate may extinguish or "blow out" the combusting PM before combustion reaches the end of the PM filter. Conversely, a low exhaust gas flow rate advances the combusting PM through the PM filter to regenerate the PM filter without extinguishing the combusting PM.

The present disclosure activates the electric heater when the engine is turned off, and exhaust gas produced by the engine regenerates the PM filter when the engine is turned on. The electric heater heats the PM filter to the PM combustion temperature while the engine is turned off and no exhaust gas flows through the electric heater. The electric heater heats at a faster rate when the engine is off than when the engine is on and exhaust gas flow is present. Although the PM filter may be heated to the PM combustion temperature, PM may not begin to combust because no exhaust gas flow is present to transfer heat from the heater, to provide oxygen for combustion, or to advance combusting PM through the PM filter.

When the engine is turned on, exhaust gas flows through the electric heater and may be heated. The heated exhaust gas provides additional heat and oxygen to regenerate the PM filter. The PM begins to combust and advance through the PM filter due to the heat and oxygen from the exhaust gas. The exhaust gas flow advances the combusting PM through the PM filter until regeneration of the PM filter completes.

The present disclosure may also pre-heat the exhaust gas input to the PM filter before the electric heater is activated. The pre-heated exhaust gas may pre-heat the PM filter to reduce the amount of time needed to electrically heat the PM filter when the engine is off. The present disclosure may determine a stopping frequency of the vehicle based on the vehicle speed during a predetermined period before the electric heater is activated. For example only, the stopping frequency may indicate when the vehicle is operating under city driving conditions. When the stopping frequency is greater than a predetermined frequency (i.e., threshold frequency), the exhaust gas may be heated by modifying engine management, using a fuel burner, and/or using a catalytic oxidizer to increase the exhaust temperature with post-injection of fuel in the engine and/or exhaust system. The heated exhaust gas flow through the PM filter and heats the PM filter before the electric heater is turned on.

Figure 1:
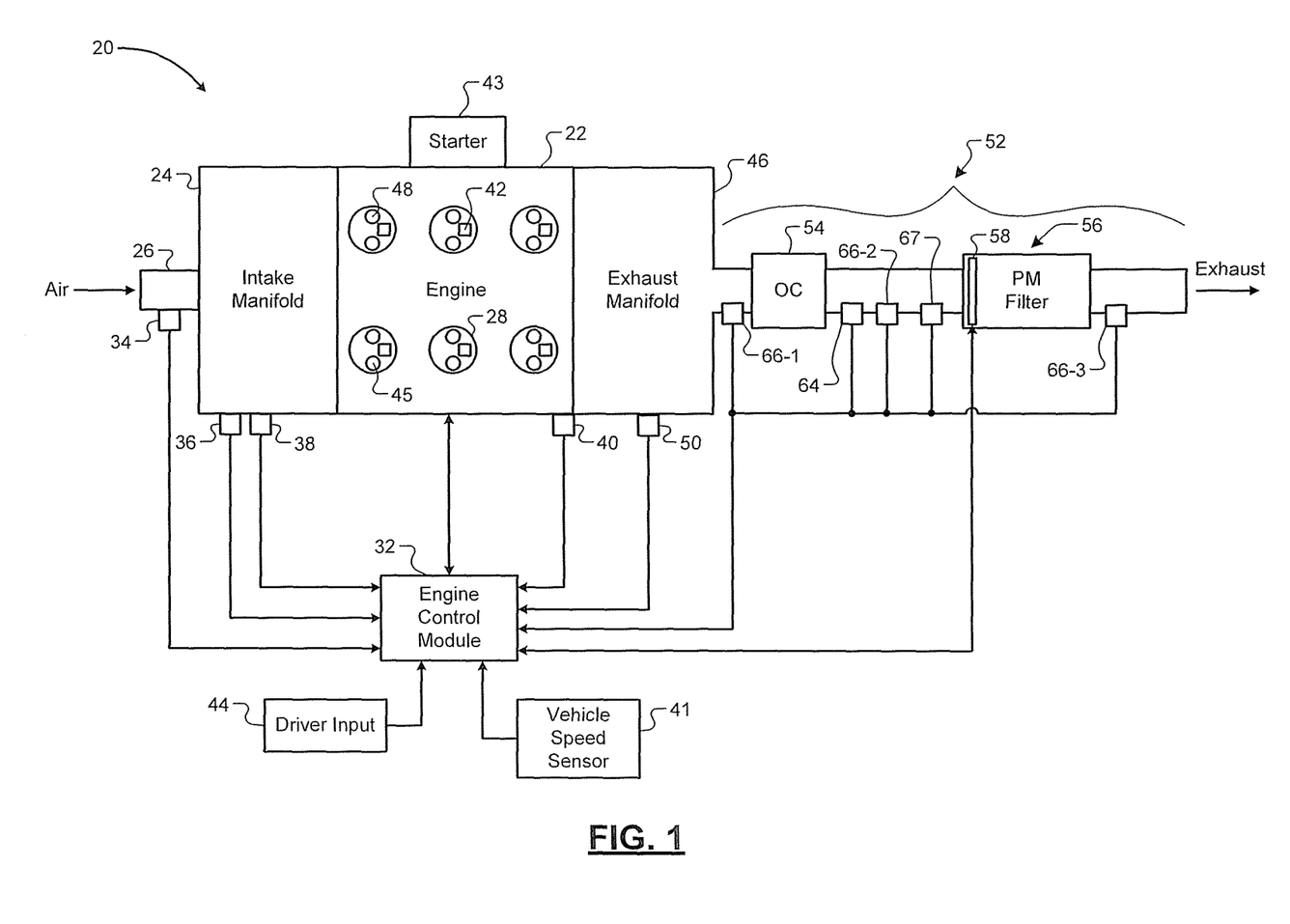
FIG. 1 is a functional block diagram of an exemplary engine system including an electrically heated particulate filter according to the principles of the present disclosure.

Referring now to FIG. 1, an exemplary engine system 20 is schematically illustrated in accordance with the present disclosure. The engine system 20 is merely exemplary in nature. The electrically heated particulate filter described herein may be implemented in various engine systems using a particulate filter. Such engine systems may include, but are not limited to, diesel engine systems, gasoline direct injection engine systems, and homogeneous charge compression ignition engine systems.

The engine system 20 includes an engine 22 that combusts an air/fuel mixture to produce drive torque. Air is drawn into an intake manifold 24 through an inlet 26. A throttle (not shown) may be included to regulate airflow into the intake manifold 24. Air within the intake manifold 24 is distributed into cylinders 28. Although FIG. 1 depicts six cylinders 28, the engine 22 may include additional or fewer cylinders 28. For example, engines having 4, 5, 8, 10, 12, and 16 cylinders are contemplated.

An engine control module (ECM) 32 communicates with components of the engine system 20. The components may include the engine 22, sensors, and actuators as discussed herein. The ECM 32 may implement control of the electrically heated particulate filter of the present disclosure.

Air passes through the inlet 26 through a mass airflow (MAF) sensor 34. The MAF sensor 34 generates a MAF signal that indicates a rate of air flowing through the MAF sensor 34. A manifold pressure (MAP) sensor 36 is positioned in the intake manifold 24 between the inlet 26 and the engine 22. The MAP sensor 36 generates a MAP signal that indicates air pressure in the intake manifold 24. An intake air temperature (IAT) sensor 38 located in the intake manifold 24 generates an IAT signal based on intake air temperature.

An engine crankshaft (not shown) rotates at engine speed or a rate that is proportional to engine speed. A crankshaft sensor 40 senses a position of the crankshaft and generates a crankshaft position (CSP) signal. The CSP signal may be related to the rotational speed of the crankshaft and cylinder events. For example only, the crankshaft sensor 40 may be a variable reluctance sensor. The engine speed and cylinder events may be sensed using other suitable methods. A vehicle speed may be measured by a vehicle speed sensor 41.

The ECM 32 actuates fuel injectors 42 to inject fuel into the cylinders 28. The ECM 32 may cut fueling to the fuel injectors 42 to stop combustion in the engine 22. The ECM 32 may start the engine 22 by activating an electric motor 43. The ECM 32 may receive driver input signals from a driver input module 44 and activate the electric motor 43 based on the driver input signals. For example only, the electric motor 43 may be a starter motor that rotates the crankshaft until the engine 22 starts combustion.

During combustion, an intake valve 45 selectively opens and closes to enable air to enter the cylinder 28. An intake camshaft (not shown) regulates the intake valve position. A piston (not shown) compresses and combusts the air/fuel mixture within the cylinder 28. The piston drives the crankshaft during a power stroke to produce drive torque.

Exhaust gas resulting from the combustion within the cylinder 28 is forced out through an exhaust manifold 46 when an exhaust valve 48 is in an open position. An exhaust camshaft (not shown) regulates the exhaust valve position. An exhaust manifold pressure (EMP) sensor 50 generates an EMP signal that indicates exhaust manifold pressure.

An exhaust treatment system 52 may treat the exhaust gas. The exhaust treatment system 52 may include an oxidation catalyst (OC) 54. The OC 54 oxidizes carbon monoxide and hydrocarbons in the exhaust gas. The OC 54 oxidizes the exhaust gas based on the post combustion air/fuel ratio. The amount of oxidation may increase the temperature of the exhaust gas.

The exhaust treatment system 52 includes a particulate matter (PM) filter assembly 56. The PM filter assembly 56 may receive exhaust gas from the OC 54 and filter any particulate matter present in the exhaust. An electric heater 58 selectively heats the exhaust and/or a portion of the PM filter assembly 56 to initiate regeneration of PM in the filter assembly 56. The ECM 32 controls the engine 22 and filter regeneration based on various sensed and/or estimated information.

More specifically, the ECM 32 may estimate a PM filter load based on the sensed and estimated information. The filter load may correspond to an amount of particulate matter in the PM filter assembly 56. The filter load may be based on an exhaust temperature and/or the exhaust flow. Exhaust flow may be based on the MAF signal and fueling of the engine 22. When the filter load is greater than or equal to a filter load threshold, the ECM 32 may initiate regeneration. The ECM 32 may activate the electric heater 58 when the engine 22 is turned off. The electric heater 58 heats more quickly when the engine 22 is turned off than when the engine is on. The ECM 32 may start the engine 22 to regenerate the PM in the PM filter assembly 56.

The exhaust treatment system 52 may include a gas sensor 64 and exhaust temperature sensors 66-1, 66-2, 66-3 (collectively exhaust temperature sensors 66). The gas sensor 64 generates gas level signals that indicate amounts of NOx and/or oxygen in the exhaust gas.

The exhaust temperature sensors 66 generate exhaust temperature signals that indicate temperatures of the exhaust gas. The exhaust temperature sensors 66 may measure temperatures of the exhaust gas before the OC 54 and the PM filter assembly 56. The exhaust temperature sensors 66 may measure temperatures of the exhaust gas after the PM filter assembly 56 and/or between the OC 54 and the PM filter assembly 56. For example only, exhaust temperature sensor 66-2 may measure an inlet temperature of the PM filter assembly 56. The ECM 32 may generate an exhaust temperature model to estimate exhaust temperatures throughout the exhaust treatment system 52.

An exhaust flow rate sensor 67 may generate a flow rate signal that indicates a flow rate of the exhaust gas into the PM filter assembly 56. The ECM 32 may also generate an exhaust flow rate model to estimate the exhaust flow rate based on fueling, MAF, and other engine conditions.

Figure 2:
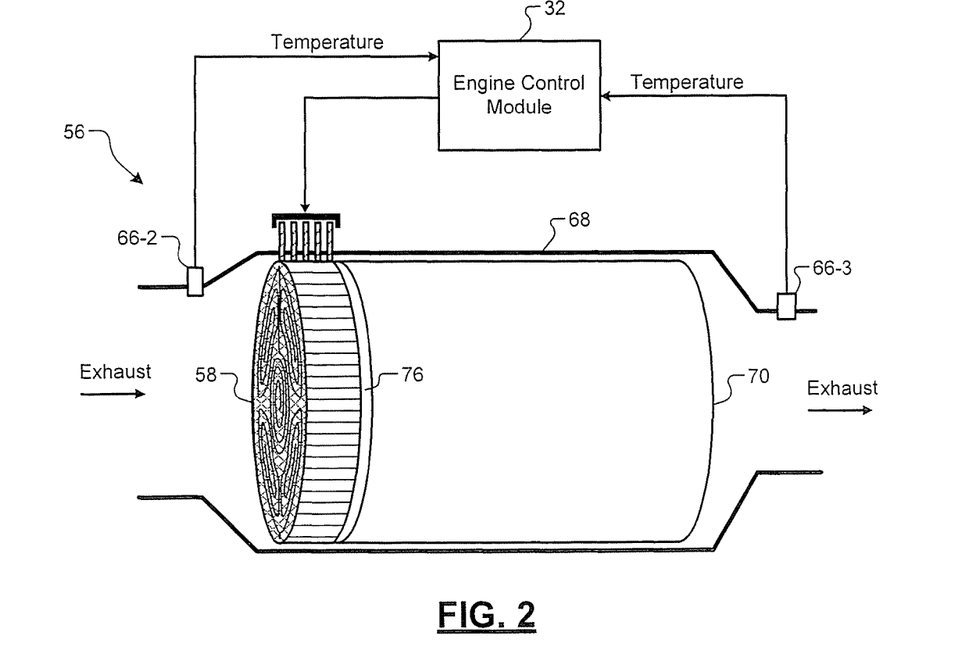
FIG. 2 illustrates the exemplary electrically heated particulate filter according to the principles of the present disclosure.
Figure 4A:
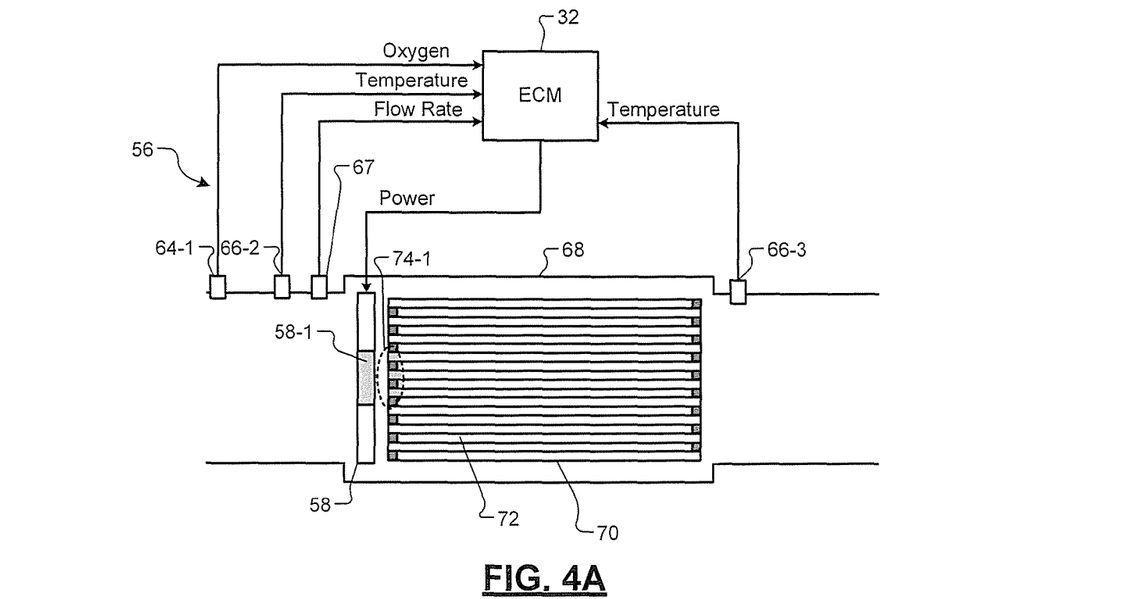
FIGS. 4A and 4B illustrate regeneration of a zone of the exemplary electrically heated particulate filter according to the principles of the present disclosure.
Figure 4B:
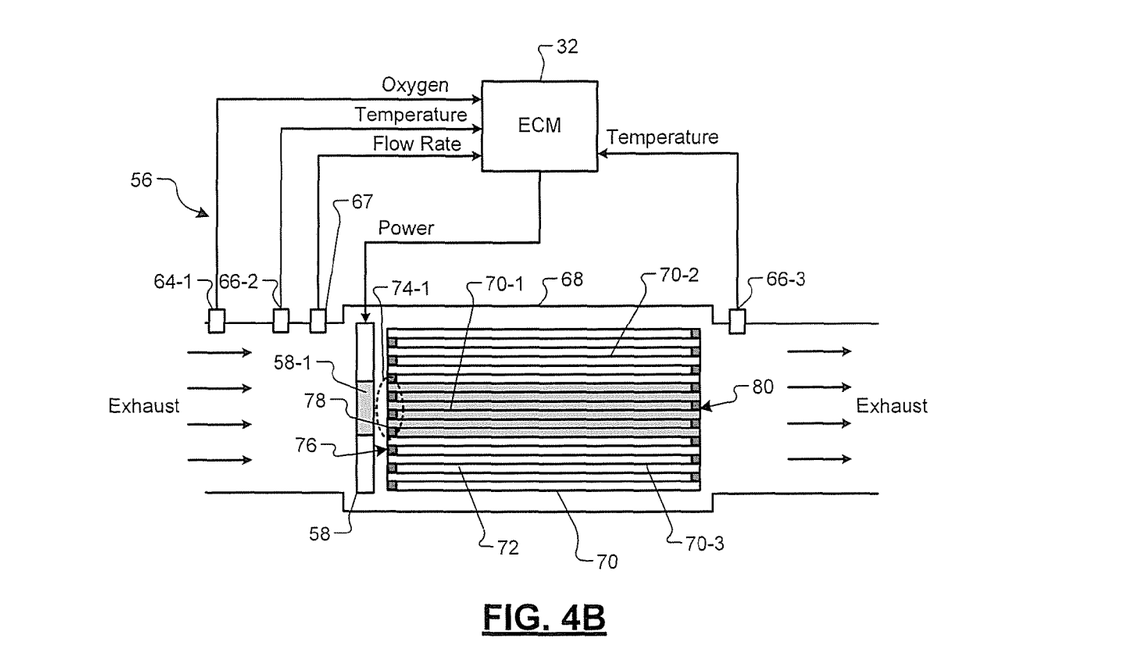

Referring now to FIGS. 2, 4A, and 4B, an exemplary PM filter assembly 56 is shown. The PM filter assembly 56 may include a housing 68, a PM filter 70, and the electric heater 58. The electric heater 58 may be arranged between the OC 54 and the PM filter 70. The ECM 32 may apply energy or power to the electric heater 58 in the form of voltage or current. The PM filter 70 includes channels 72 through which exhaust gas may flow. PM may be filtered as the exhaust gas passes through the channels 72, leaving PM inside the channels 72.

Figure 3:
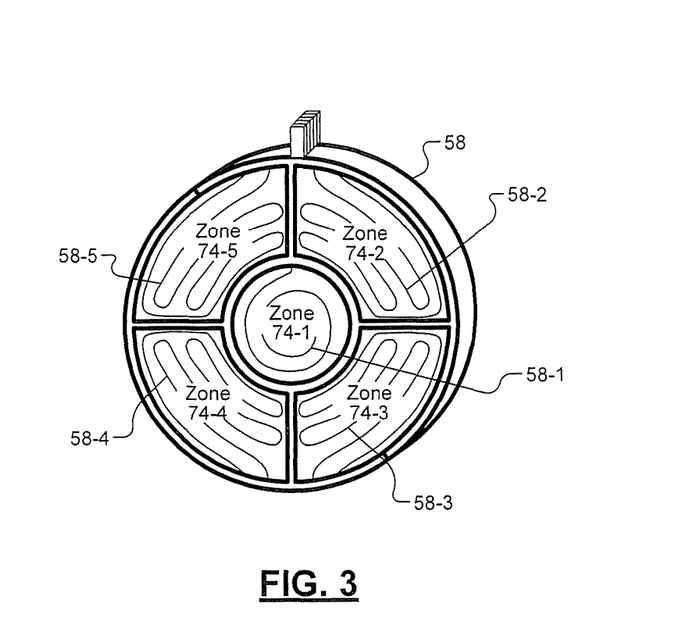
FIG. 3 illustrates zones of the electrically heated particulate filter according to the principles of the present disclosure.

Referring to FIG. 3, the electric heater 58 may comprise one or more coils, heater segments, or conductive elements that cover a plurality of zones of the PM filter 70. For example only, a first zone 74-1 may be a center zone that includes an axially centered area of an inlet 76 of the PM filter 70. Remaining zones 74-2, 74-3, 74-4, and 74-5 may surround the first zone 74-1 of the PM filter 70. Each zone may be an area of the PM filter 70 in contact with the electric heater 58. Each zone may include a portion of the PM filter 70 downstream of the electric heater 58.

When the engine 22 is off, one or more segments 58-1, 58-2, 58-3, 58-4, and 58-5 of the electric heater 58 may be activated by the ECM 32. Each segment corresponds to a zone of the PM filter 70. For example only, a first segment 58-1 corresponds to the first zone 74-1. The electric heater 58 may be activated until a temperature of the zone is greater than or equal to the PM combustion temperature. For example only, PM may combust at a temperature of approximately 600° C.

Referring now to FIG. 4A, the ECM 32 activates segment 58-1 to heat the first zone 74-1 when the engine 22 is off. The segment 58-1 increases in temperature at a faster rate when the engine 22 is off than when the engine 22 is on because no exhaust gas flows through the segment 58-1 to cool the segment 58-1. When the engine 22 is on, exhaust gas may cool the segment 58-1 because the temperature of the segment 58-1 is greater than the exhaust gas temperature. Therefore, heat transfers from the hotter segment 58-1 to the cooler exhaust gas.

In FIG. 4A, no exhaust gas flows through the PM filter 70 or the electric heater 58. The ECM 32 controls the segment 58-1 to a first temperature that increases a temperature of the zone 74-1 to a PM combustion temperature. PM in the zone 74-1 (shaded portions of channels 72) does not begin to combust because little oxygen is available to burn with the PM. Combusting PM does not advance through channels 72 of the PM filter 70 because no exhaust gas flows through the PM filter 70.

Referring now to FIG. 4B, the ECM 32 starts the engine 22 and exhaust gas begins to flow from the engine 22 to the exhaust system 52. Exhaust gas enters the PM filter 70 from the electric heater 58 through an inlet 76 of the PM filter 70. The first segment 58-1 heats a portion of the exhaust gas before the portion enters the first zone 74-1. The first segment 58-1 may also continue to directly heat the first zone 74-1. The exhaust gas includes an amount of oxygen that begins to combust with the PM in the first zone 74-1. For example only, PM may begin to combust behind end plugs 78 in the first zone 74-1. The exhaust gas advances the combusting PM through a first filter portion 70-1 (shaded channels 72) of the PM filter 70.

Regeneration continues through the first filter portion 70-1 as the exhaust gas flow advances the combusting PM. The ECM 32 may control the segment 58-1 to a second temperature to maintain an exhaust temperature that continues regeneration of the first filter portion 70-1. Alternatively, the ECM 32 may turn the segment 58-1 off. The first filter portion 70-1 may include one or more channels 72 extending from the first zone 74-1 to a PM filter outlet 80. The PM filter 70 may include a plurality of filter portions 70-2, 70-3, 70-4 (not shown), and 70-5 (not shown) corresponding to each of the zones 74-2, 74-3, 74-4, and 74-5 respectively. The ECM 32 may regenerate each of the portions in the same manner as the first filter portion 70-1.

The PM filter 70 may be pre-heated to an electrical regeneration temperature using an exhaust gas heating technique such as post-injection of fuel and/or a fuel burner. Pre-heating the PM filter 70 may decrease the amount of time and/or energy required to regenerate portions of the PM filter 70 using the electric heater 58. Fuel may be injected into the cylinders 28 by the fuel injectors 42 or into the exhaust system 52 and combusted within the OC 54. The combustion increases the temperature of the exhaust gas entering the PM filter 70. The heated exhaust gas heats the PM filter 70 to the electrical regeneration temperature.

The ECM 32 may determine when to pre-heat the PM filter 70 based on a stopping frequency of the vehicle. For example only, when the vehicle makes frequent stops, the ECM 32 may have more opportunities to regenerate the PM filter 70 using the control system and methods of the present disclosure. The ECM 32 may determine the stopping frequency based on a number of vehicle stops (i.e., when vehicle speed is less than a predetermined speed threshold), stop durations, and a predetermined period.

When the stopping frequency is greater than a stopping frequency threshold, the ECM 32 may pre-heat the PM filter 70 using exhaust gas heating when the engine 22 is on. Pre-heating the PM filter 70 may reduce the amount of power used to heat the electric heater 58. For example only, a segment of the electric heater may be heated to a lower temperature (i.e., requiring less power) when the PM filter 70 is pre-heated. Pre-heating the PM filter 70 may also reduce the amount of time to regenerate the PM filter 70.

Figure 5:
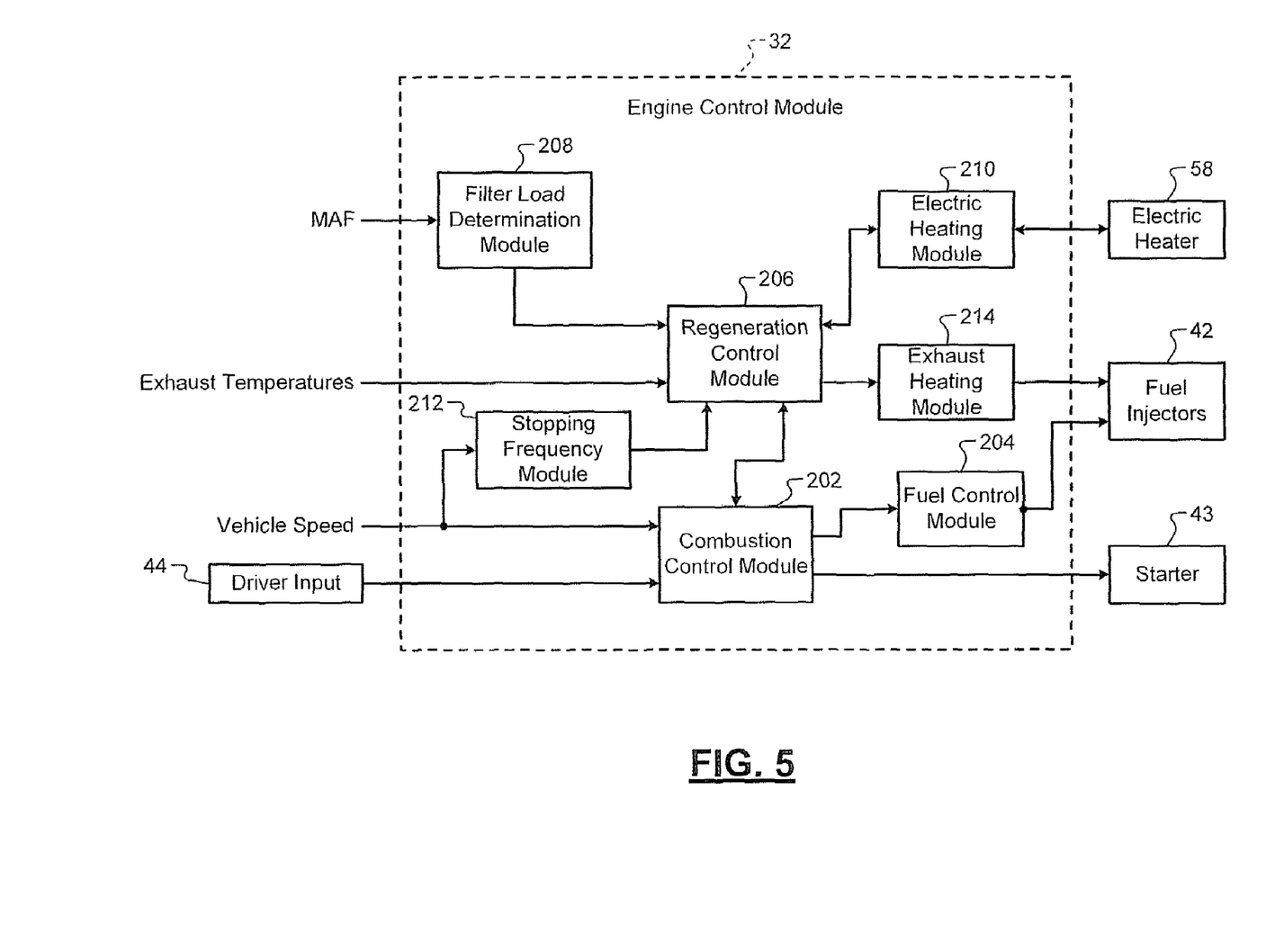
FIG. 5 is a functional block diagram of an exemplary engine control module according to the principles of the present disclosure.

Referring now to FIG. 5, a functional block diagram of an exemplary ECM 32 is presented. The ECM 32 may include a combustion control module 202 that starts and stops combustion in the engine 22. The combustion control module 202 may stop combustion in the engine 22 by deactivating a fuel control module 204. The combustion control module 202 may start the engine 22 by activating the starter 43. The starter 43 may rotate the crankshaft of the engine 22 to start combustion.

The ECM 32 may include a regeneration control module 206 that controls regeneration of the PM filter 70. The regeneration control module 206 may determine whether to regenerate the PM filter 70 based on the filter load. A filter load determination module 208 may determine the filter load based on MAF, fueling, an amount of time the engine 22 runs, a mileage of the vehicle, and/or other engine conditions. When the filter load is greater than the filter load threshold, the regeneration control module 206 may regenerate the PM filter 70.

The regeneration control module 206 may begin regeneration by activating an electric heating module 210 to heat one or more segments of the electric heater 58 when the engine is turned off. For example only, the combustion control module 202 may turn the engine 22 off to conserve fuel when a driver applies a brake input device and the vehicle is stopped. When the engine 22 is off, the electric heating module 210 activates a segment, such as the first segment 58-1, of the electric heater 58 to heat a zone, such as the first zone 74-1, of the PM filter 70. The electric heating module 210 may control the segment 58-1 to a first temperature corresponding to the PM combustion temperature in the first zone 74-1. PM in the first zone 74-1 may not begin to combust.

The combustion control module 202 may start the engine 22, for example only, when a driver releases a brake input device. Alternatively, the combustion control module 202 may start the engine 22 when the segment 58-1 temperature is greater than or equal to the first temperature for a predetermined period. The combustion control module 202 may start the engine 22 to prevent overheating and/or wasted electrical power by the electric heater 58.

When the engine 22 starts, the segment 58-1 heats a portion of the exhaust gas of the engine 22. The temperature of the first zone 74-1 may be greater than or equal to the PM combustion temperature due to the heat applied while the engine 22 is off. The heated exhaust gas provides additional heat and oxygen necessary to begin combustion of PM in the first zone 74-1. When PM combustion begins, a regeneration cycle begins. The exhaust gas flow advances the combusting PM through the first filter portion 70-1 during the regeneration cycle to regenerate the first filter portion 70-1.

During the regeneration cycle, the electric heating module 210 may control the electric heater 58 to a second temperature based on the inlet exhaust gas temperature, an oxygen concentration of the exhaust gas, and/or the exhaust gas flow rate. The electric heater 58 may continue to provide additional heat to the exhaust gas to continue regeneration. Alternatively, when no additional heat is needed to continue regeneration, the electric heating module 210 may deactivate the electric heater 58. PM in the first filter portion 70-1 continues to combust while the exhaust gas flows through the PM filter 70.

The combustion control module 202 keeps the engine running during the regeneration cycle. For example only, the regeneration control module 206 may communicate with the combustion control module 202 whether the regeneration cycle has completed. When the regeneration cycle has not completed, the combustion control module 202 does not stop combustion in the engine 22, regardless of vehicle speed and the brake input device. If the combustion control module 202 stopped combustion in the middle of a regeneration cycle of a filter portion, regeneration of the filter portion would not complete. Exhaust gas would stop advancing the combusting PM and a lack of oxygen from the exhaust gas would smother the combusting PM in the filter portion.

The PM filter 70 may be pre-heated before the electric heating module 210 activates the electric heater 58. Pre-heating the PM filter 70 may reduce the amount of time and energy required to regenerate the PM filter 70. For example only, pre-heating the PM filter 70 may allow the electric heating module 210 to heat the electric heater 58 to a lower temperature.

The regeneration control module 206 may determine to pre-heat the PM filter 70 based on the stopping frequency of the vehicle. A stopping frequency module 212 may determine the stopping frequency based on the vehicle speed during a period. For example only, when the vehicle stops, the stopping frequency module may increase the stopping frequency. When the stopping frequency is greater than a stopping frequency threshold, the PM filter 70 may be pre-heated. The PM filter 708 may be pre-heated while the engine 22 is turned on.

The exhaust gas flowing through the PM filter 70 may be heated by modifying engine management, using a fuel burner, and/or using a catalytic oxidizer to increase the exhaust temperature with after injection of fuel. An exhaust heating module 214 may adjust fueling by the fuel control module 204 to heat the exhaust gas. The fuel may be oxidized by the OC 54 to increase the exhaust temperature. Heat from the heated exhaust gas transfers to the PM filter 70 to increase the PM filter temperature to the electric regeneration temperature.

Figure 6:
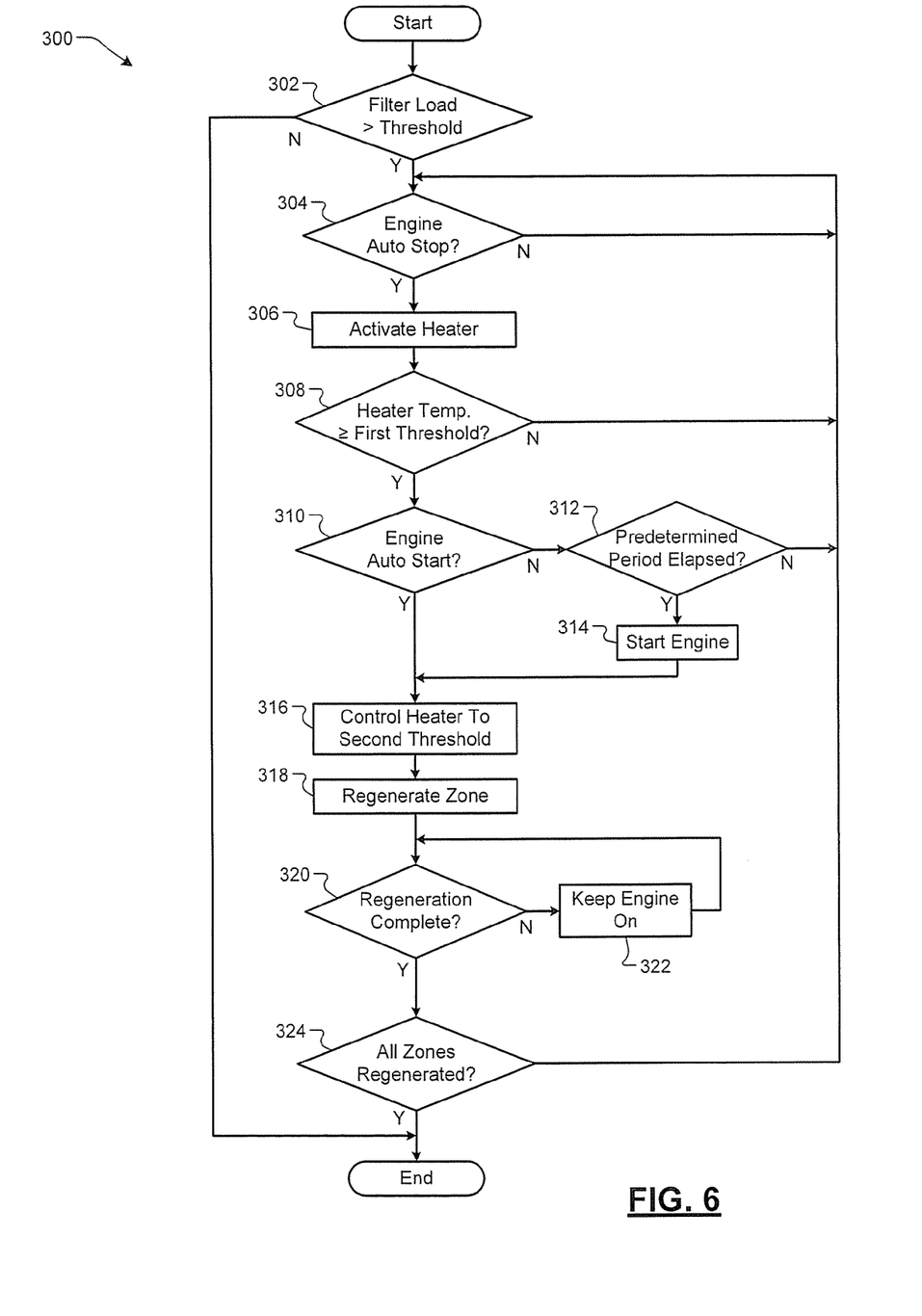
FIG. 6 is a flowchart depicting exemplary steps performed in the engine control module according to the principles of the present disclosure.

Referring now to FIG. 6, a flowchart 300 depicts exemplary steps of a method performed by the ECM 32. In step 302, control determines when the filter load is greater than the filter load threshold and regeneration is needed. When regeneration is needed, control proceeds to step 304, otherwise control ends.

In step 304, control determines whether to stop the engine 22. When the engine 22 is stopped, combustion stops and no exhaust gas flows from the engine 22. Control activates the electric heater 58 to heat a zone of the PM filter 70 in step 306. For example only, control may activate the segment 58-1 to heat the first zone 74-1. In step 308, control determines when the heater temperature is greater than or equal to a first temperature threshold. The first temperature threshold may correspond to a zone temperature greater than or equal to the PM combustion temperature. The electric heater 58 heats to the first temperature threshold more quickly when the engine 22 is off and exhaust flow stops than when the engine 22 is on. When the heater temperature is less than the first temperature threshold and the engine 22 is off, control continues to activate the electric heater 58. PM in the zone does not combust.

In step 310, control determines whether to start the engine 22. When the engine 22 is started, combustion starts and exhaust gas flows from the engine 22 to the PM filter 70. Control continues to step 316. Otherwise, control proceeds to step 312. In step 312, control determines whether the electric heater 58 has been activated for a predetermined period. When the electric heater 58 has been activated and the predetermined period has not elapsed, control returns to step 304. When the predetermined period has elapsed, control starts the engine 22 in step 314. When the engine 22 starts, exhaust gas begins to flow to the PM filter 70.

In step 316, control may heat the electric heater 58 to a second temperature. Alternatively, control may turn the electric heater 58 off. In step 318, the electric heater 58 heats the exhaust gas entering the zone of the PM filter 70. The PM in the zone ignites due to oxygen in the exhaust gas and heat from the heated exhaust gas, and heat built up in the zone from heating when the engine 22 was off. Regeneration of the zone begins and continues while combusting PM advances through the PM filter 70. In step 320, control may determine whether regeneration of the zone is complete. When regeneration is complete, control continues to step 324, otherwise control proceeds to step 322.

In step 322, control keeps the engine 22 running until regeneration of the zone completes. Because regeneration is not complete, the engine 22 must be kept on to provide exhaust gas to the combusting PM. In step 324, control determines whether all zones of the PM filter 70 have been regenerated. When all zones are regenerated, control ends, otherwise control returns to step 304.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system comprising:
    a regeneration control module that selectively determines that a regeneration cycle of a particulate matter (PM) filter is needed based on a load of the PM filter;
    a stopping frequency module that determines a stopping frequency of a vehicle based on a number of vehicle stops over a predetermined period; and
    a combustion control module that:
        before the regeneration cycle of the PM filter, provides fuel to an oxidation catalyst (OC) located upstream of the PM filter in response to a determination that the stopping frequency is greater than a predetermined frequency; and
        before the regeneration cycle of the PM filter, selectively shuts down an engine,
    wherein, while the engine is shut down before the regeneration cycle, the regeneration control module activates an electric heater to heat an inlet of the PM filter,
    wherein the combustion control module selectively starts the engine before the regeneration cycle, and
    wherein exhaust gas produced by the engine enters the inlet of the PM filter and initiates the regeneration cycle of the PM filter.

2. The control system of claim 1, wherein the regeneration control module controls the electric heater to a first temperature while the engine is shut down before the regeneration cycle.

3. The control system of claim 2, wherein the regeneration control module controls the electric heater to a second temperature based on at least one of a temperature of the exhaust gas, an oxygen concentration of the exhaust gas, and a flow rate of the exhaust gas after the startup of the engine.

4. The control system of claim 3, wherein the second temperature is less than the first temperature.

5. The control system of claim 2, wherein the combustion control module starts the engine in response to a second determination that a temperature of the electric heater is greater than or equal to the first temperature for a predetermined period.

6. The control system of claim 5, wherein the combustion control module starts the engine in response to the second determination before a brake pedal is released.

7. The control system of claim 6, wherein the combustion control module shuts down the engine in when a speed of the vehicle is less than a predetermined speed and the brake pedal is depressed.

8. The control system of claim 1 wherein the stopping frequency module determines the stopping frequency based on the number of vehicle stops during the predetermined period before the combustion control module shuts down the engine.

9. The control system of claim 8 wherein the stopping frequency module determines the stopping frequency further based on a stop duration.

10. The control system of claim 1 wherein, after the start of the engine, the combustion control module maintains the engine running independent of vehicle speed and actuation of a brake pedal.

11. A method comprising:
    selectively determining that a regeneration cycle of a particulate matter (PM) filter is needed based on a load of the PM filter;
    determining a stopping frequency of a vehicle based on a number of vehicle stops over a predetermined period;
    before the regeneration cycle of the PM filter, providing fuel to an oxidation catalyst (OC) located upstream of the PM filter in response to a determination that the stopping frequency is greater than a predetermined frequency;
    before the regeneration cycle of the PM filter, selectively shutting down an engine;
    while the engine is shut down before the regeneration cycle, activating an electric heater to heat an inlet of the PM filter; and
    selectively starting the engine before the regeneration cycle,
    wherein exhaust gas produced by the engine enters the inlet of the PM filter and initiates the regeneration cycle of the PM filter.

12. The method of claim 11, further comprising controlling the electric heater to a first temperature while the engine is shut down before the regeneration cycle.

13. The method of claim 12, further comprising controlling the electric heater to a second temperature based on at least one of a temperature of the exhaust gas, an oxygen concentration of the exhaust gas, and a flow rate of the exhaust gas after the startup of the engine.

14. The method of claim 13, wherein the second temperature is less than the first temperature.

15. The method of claim 12, further comprising starting the engine in response to a second determination that a temperature of the electric heater is greater than or equal to the first temperature for a predetermined period.

16. The method of claim 15, further comprising starting the engine in response to the second determination before a brake pedal is released.

17. The method of claim 16, further comprising shutting down the engine when a speed of the vehicle is less than a predetermined speed threshold and the brake pedal is depressed.

18. The method of claim 11 further comprising determining the stopping frequency based the number of vehicle stops over the predetermined period before the engine shutdown.

19. The method of claim 18 further comprising determining the stopping frequency further based on a stop duration.

20. The method of claim 11 further comprising, after the start of the engine, maintains the engine running independent of vehicle speed and actuation of a brake pedal.

* * * * *